B. & E. SÁGI.
METHOD OF AND APPARATUS FOR TESTING LIQUIDS AND OTHER MATERIALS.
APPLICATION FILED JUNE 30, 1913.

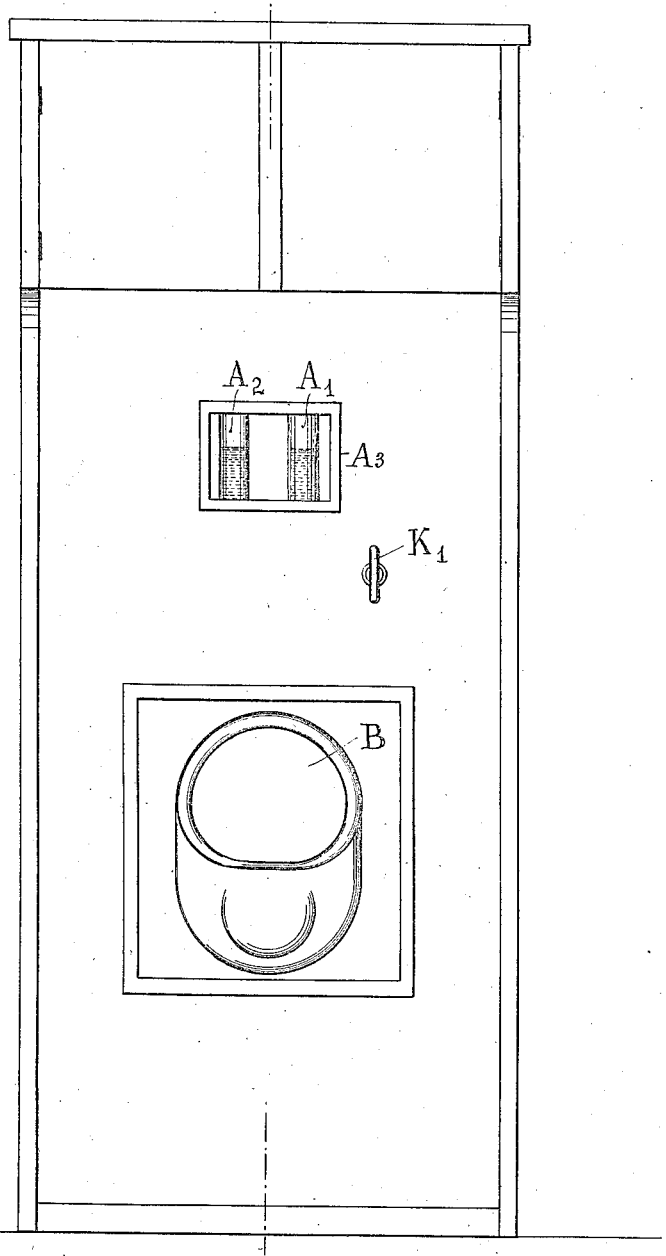

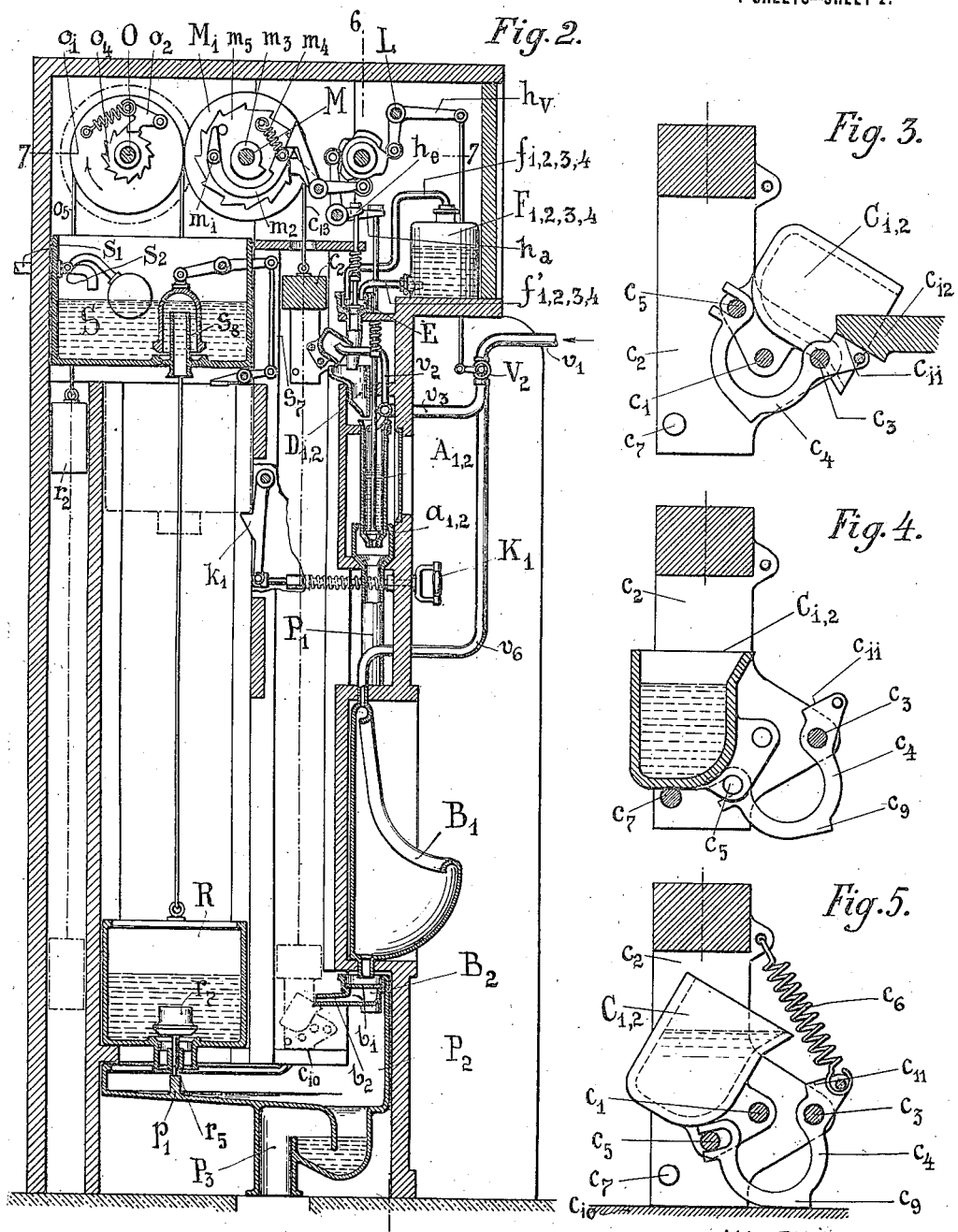

1,163,693.

Patented Dec. 14, 1915.
4 SHEETS—SHEET 4.

WITNESSES:

INVENTORS:
Béla Sági and Eugen Sági,
By Attorneys,

UNITED STATES PATENT OFFICE.

BÉLA SÁGI AND EUGEN SÁGI, OF BUDAPEST, AUSTRIA-HUNGARY.

METHOD OF AND APPARATUS FOR TESTING LIQUIDS AND OTHER MATERIALS.

1,163,693. Specification of Letters Patent. Patented Dec. 14, 1915.

Application filed June 30, 1913. Serial No. 776,643.

*To all whom it may concern:*

Be it known that we, BÉLA SÁGI and EUGEN SÁGI, both subjects of the King of Hungary, residing at Budapest, Austria-Hungary, have jointly invented certain new and useful Improvements in Methods of and Apparatus for Testing Liquids and other Materials, of which the following is a specification.

The object of this invention is to provide means whereby a person unskilled in making tests may readily procure the testing of a sample of some liquid, either to ascertain whether or not the same is pure, if a food product for instance, or in case of urine to ascertain the presence of sugar or albumen, or diseased material. It not only affords the unskilled with the means of effecting such tests, but also provides those who have frequently to make the same tests upon samples of like material, a ready means of accomplishing the same without recourse to the tedium of detail in each instance.

In the accompanying drawings there is illustrated a practical embodiment of mechanism for carrying out our improved method. This apparatus is particularly intended for the testing of urine.

Figure 6:
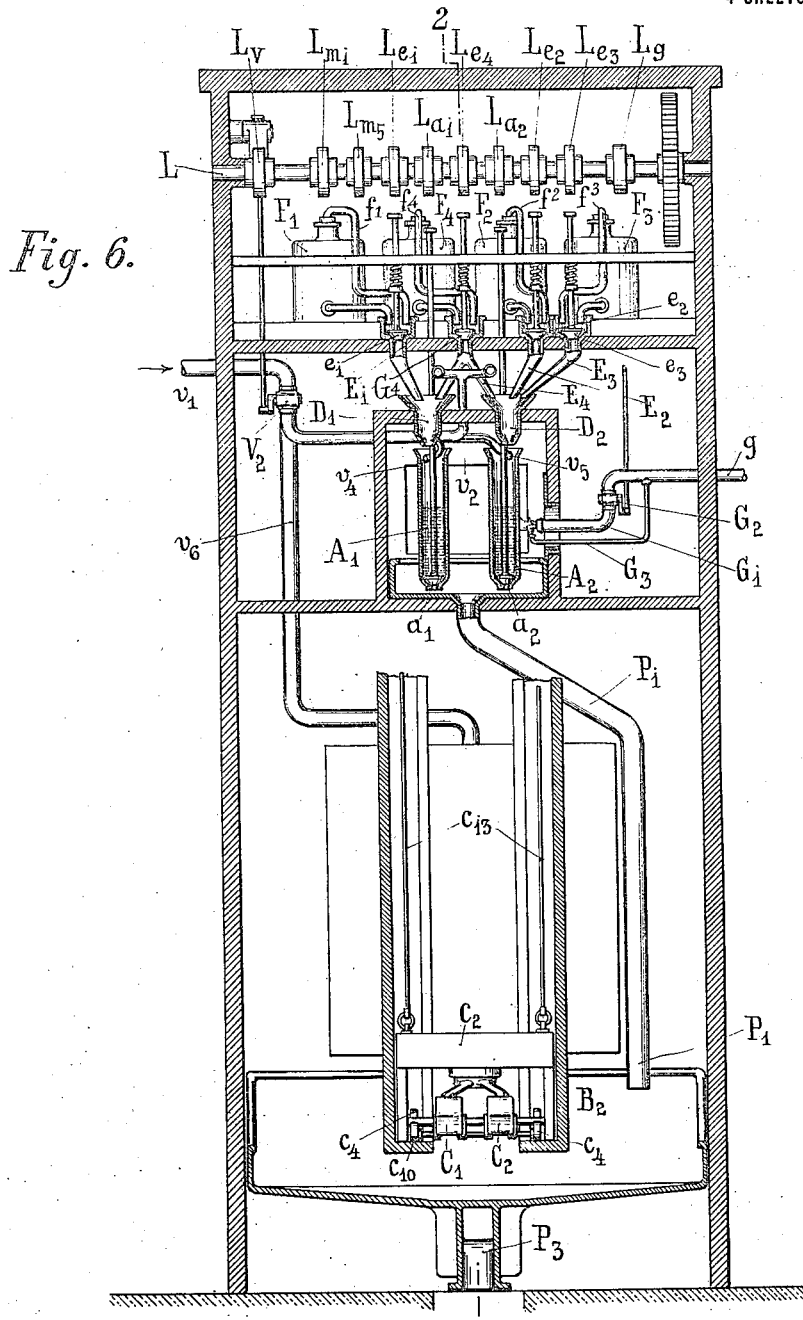
Figure 7:
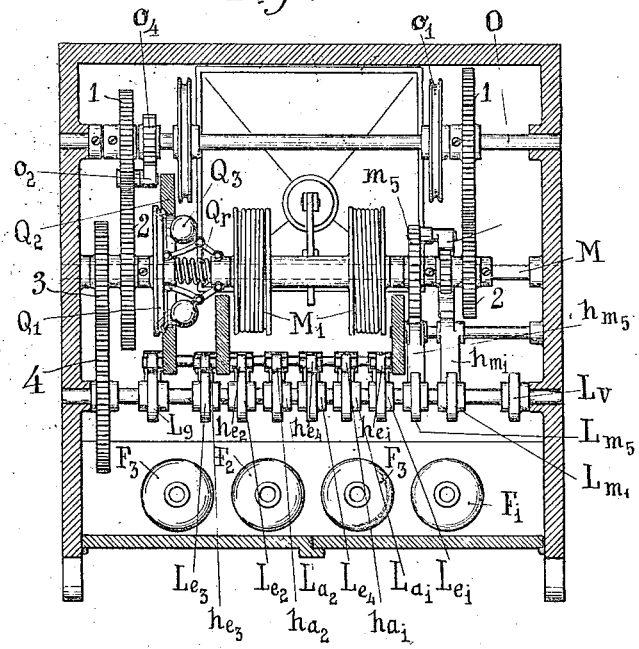
Figure 8:
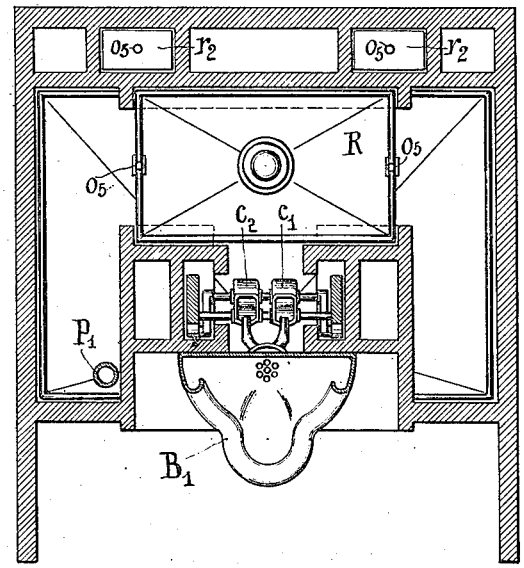

In these drawings,—Figure 1 is a front elevation of the apparatus; Fig. 2 is a central vertical section taken on about the plane of the line 2—2 in Figs. 1 and 6; Figs. 3, 4 and 5 show positions assumed by the measuring receptacle or gage which is employed for receiving a predetermined quantity of the liquid to be subjected to the test; Fig. 6 is a vertical section of the device taken on about the plane indicated by the line 6—6 in Fig. 2; Fig. 7 is a horizontal section of the upper portion of the apparatus taken on about the plane of the line 7—7 in Fig. 2; and Fig. 8 is a horizontal section of the lower portion of the apparatus.

This improvement is useful for testing samples of various liquids. The operator has simply to supply a quantity of liquid, preferably in excess of that required for the test, deposit this in the machine, which will take the required sample or a plurality of these from the liquid supplied, and upon manipulation of an actuator the test will proceed and the results be displayed to the operator. A urine testing machine is herein described and shown as illustrative of the invention.

In the front elevation of the device there are shown two test tubes $A_1$ $A_2$ displayed through a window $A_3$, and under these the basin of the urinal $B_1$. After urinating into the basin or introducing into the same a quantity of urine, the driving mechanism later to be described is set into operation by pulling upon the handle $K_1$. The test tubes herein illustrated will be formed of glass open at top and bottom, the bottoms being closed by means of stoppers $a_1$ $a_2$.

The apparatus is arranged for automatically carrying out the following steps:—
(*a*) Preparation, comprising filtering, elevating and introducing the liquid into the test tubes. (*b*) Investigation, comprising addition of reagent fluids, heating the sample. (*c*) Cleansing the apparatus, which may consist not only of rinsing the various parts, but also of adding to the rinsing water certain material necessary for dissolving the precipitate.

The materials used for testing and the reagents are shown stored in bottles $F_1$ $F_2$ $F_3$ $F_4$, which are connected by means of suitable tubes $f_1$ $f_2$ $f_3$ $f_4$ at their upper portions and tubes $f'_1$ $f'_2$ $f'_3$ $f'_4$ at their lower portions respectively with the vessels $E_1$ $E_2$ $E_3$ $E_4$. Below these vessels there are disposed two funnels $D_1$ $D_2$ with which the vessels above referred to are in communication. Each of the vessels above referred to is provided with a stopper, which stoppers are indicated by $e_1$ $e_2$ $e_3$ $e_4$. The liquid in the vessels above referred to is preserved at the proper level in accordance with Mariotte's principle.

The stoppers above referred to are actuated by the operating mechanism to be described later, in such a manner that the desired quantity of liquid will be caused to pass to the funnels $D_1$ $D_2$ at each testing operation. The funnels $D_1$ $D_2$ are disposed above and empty into the test tubes $A_1$ $A_2$ respectively.

The heating necessary for detecting the sugar reaction is brought about by means of the gas burner $G_1$ arranged on the side of the test tube $A_2$. The burner is controlled by means of a gas cock $G_2$ in the gas conductor $g$. A pilot flame $G_3$ is employed for effecting the lighting when the gas cock is open. The means for regulating the intensity of the flame are not illustrated.

The mechanism will be driven by some suitable force. In the present illustration a gravity motor is illustrated which is operated in the present instance by means of the water used for flushing certain portions of the apparatus. The urinal basin $B_1$ discharges part of the liquid deposited in it into the gages or samplers, and the excess flows into a sink or hopper $P_2$. There is located above this sink a tank S which is supplied with water from a suitable pipe $S_1$ controlled by a ball valve $S_2$. A tank R is mounted in a vertical guideway and is provided with a rope $o_5$ passing over a drum $o_1$ and having a weight $r_2$. There are a pair of these drums and ropes, one for each end of the tank R, loose upon the driving shaft O. When the tank R is empty, it will be raised by the counterweights into position to engage the tripping device $r_6$, and by means of the connections $s_7$ will open the discharge device $s_8$ of the water tank S and permit the predetermined charge of water therein to flow into the tank R. The tank R is held in its elevated position by means of the detent $k_1$. The tank R is provided at its bottom with a valve $r_7$ having a dependent stem $r_5$ which will be tripped when the tank R reaches its down position by means of a tripping device comprising an upstanding pin $p_1$. The drums $o_1$ are loose upon the shaft O, and each has fast with it a ratchet wheel $o_4$ which transmits motion to the driving train by means of a pawl $o_2$. The driving train comprises a pair of gear wheels 1 on the shaft O meshing with wheels 2 on the shaft M, which shaft carries a wheel 3 meshing with a wheel 4 on the cam shaft L.

The speed communicated from the gravity motor will be controlled in some suitable manner. There is illustrated a brake disk $Q_1$ controlled by a ball governor $Q_3$ and adapted to be drawn against a friction surface $Q_2$ to regulate the speed.

The opening and closing of the various stoppers and cocks at the predetermined times are effected by means of properly timed cams $La_1$ $La_2$ $Le_1$ $Le_2$ $Le_3$ $Le_4$ $Lg$ $Lv$ keyed upon the cam shaft L, which from the fact of its controlling the various operations can properly be called the control shaft. The cams above referred to operate the parts by means of levers $ha_1$ $ha_2$ $he_1$ $he_2$ $he_3$ $he_4$ $hg$ $hv$. The lever arms may be provided with antifriction rollers for engaging the cams.

The receiving basin $B_1$ has located beneath it a funnel $B_2$ provided with two outlet branches $b_2$. In the upper portion of the funnel will be located some suitable filtering material $b_1$. Each of the funnel branches will lead to a sample measure or gage $C_1$ $C_2$. The illustrative embodiment of the invention provides for simultaneously performing tests upon two samples of liquid as above stated. The sample measures or gages are illustrated in detail in Figs. 3, 4 and 5. The Fig. 5 position shows the gage slightly tipped, so that when the liquid is presented to it by means of the funnel and it has received all it is capable of receiving while in its tipped position, it will be only partially full when it is caused to assume its upright position, the position illustrated in Fig. 4. By this means a predetermined quantity of liquid may be placed in the gage and with safety transported to the point of delivery.

The sample measures or gages are shown mounted upon a shaft $c_1$ journaled in the frame $c_2$. This frame is mounted in a vertical guideway and is sufficiently heavy to assume its lower position by gravity. A tipping arm $c_4$ is journaled in the frame upon a pivot $c_3$ for each of the gages. The forked end of this arm engages a pivot $c_5$ on the gage. A spring $c_6$ holds the gage in the upright position, the position illustrated in Fig. 4, wherein the bottom of the gage is engaged by a limiting or positioning lug $c_7$. When the gages are in their lower position, namely, the dotted line position in Fig. 2, and the position shown in Fig. 5, a portion $c_9$ of the arm $c_4$ will engage the surface $c_{10}$ and slightly tip the gage. When the gage arrives at the top of its guideway, a portion $c_{11}$ of the arm will engage an abutment $c_{12}$, and empty the contents of the gage. The contents of gage $C_1$ will empty into funnel $D_1$, and the contents of gage $C_2$ will empty into funnel $D_2$.

The elevation of the samples is produced in the illustration in the following manner: A pair of drums $M_1$ are mounted free upon the shaft M, and to these drums there are fastened the cables $c_{13}$ connected to the frame $c_2$ which carries the gages. A pawl $m_3$ is fast upon the shaft M. A pawl lever $m_2$ is pivoted by means of a pin $m_1$ to one of the drums $M_1$, which are fastened together. A spring $m_4$ controls the action of the pawl lever $m_2$.

The operation of the machine is substantially as follows: The liquid to be tested will be placed in the basin $B_1$, as for instance by the operator urinating therein. The liquid will be filtered and pass out through the funnel branches $b_2$, and a sample of predetermined volume placed in the measuring gages $C_1$ $C_2$. The excess of the supply of liquid will enter the hopper or sink $P_2$ and pass from there by means of the trap $P_3$. The operator will then take hold of the handle $K_1$ and draw this out, the drawing out of which handle will withdraw the detent $k_1$ from below the water tank R and permit this tank to descend, the descent of which water tank will supply the driving force to the various portions of the mechanism. The frame $c_2$ will be acted upon and elevate the gages. As soon as the tilting arms $c_4$ are moved out of engagement with the surface $c_{10}$ the gages will be turned into their upright positions, in which positions there is a margin of safety against the contents slopping out. The pawl $hm_1$ actuated by the cam disk $Lm_1$ of the controlling shaft, releases the pawl $m_2$ and permits the drums $M_1$ to rotate and bring the gages to their upper position, wherein the portion $c_{11}$ of the tilting levers will engage the abutment $c_{12}$ and tip the gages into the positions illustrated in Figs. 2 and 3, whereby the two samples of liquid will be deposited in the respective tubes. The rotation of the control or cam shaft L will then actuate the various levers and bring the desired testing materials into the proper test tubes and apply the heat to the test tube which is to be heated. The operator standing in front of the apparatus will watch the reactions taking place in the test tubes through the window $A_3$. If the apparatus is intended for use of the general public or those not skilled in the art of making the tests, certain printed instructions will be displayed in some conspicuous place, so that the operator may know from the reactions taking place within the test tubes, the result of the test which is being made. The mechanism will be so timed that after a sufficient interval for observation has elapsed, the stoppers $a_1$ $a_2$ in the lower ends of the test tubes will be unseated, and the contents permitted to pass through the discharge pipe $P_1$ which leads to the sink $P_2$. At the same time the lever $hv$ will be actuated by means of the cam $Lv$ which will open the cock $V_2$ in the water supply pipe $v_1$. A branch pipe $v_2$ has nozzles for discharging into the gages while still held in their tilted position of Fig. 2, the rinsing water running from these gages into the funnels, and from thence into the test tubes. A branch pipe $v_3$ is provided for rinsing the test tubes, it having nozzles $v_4$ $v_5$ arranged tangentially to the walls of the respective test tubes, in order that the rinsing water may run in a spiral along such walls. A pipe $v_6$ is provided for rinsing the basin $B_1$. During the first part of the rinsing, it is found desirable to dissolve the precipitate by use of a few drops of hydrochloric acid, which will be caused to pass from the suitable bottle, as for instance the bottle $F_4$. The mechanism is so timed that after the rinsing is accomplished, the valve $V_2$ will be closed, and the frame $c_2$ carrying the sample gages will be returned to their initial position ready to receive a fresh sample. The water tank R will then reach its lowest position wherein the valve $r_7$ will be unseated to permit the contents of the tank R to discharge through the sink $P_2$ and rinse out all the liquids which have been deposited therein. The tank R being now empty will be free to respond to its counterweights $r_2$ and be elevated into its position to again receive a charge of water from the tank S.

It will be apparent that changes of detail may be made in the mechanism without departing from the spirit of the invention, and that although the testing of but one specifically named substance, a liquid has been described in detail, the invention may be used in connection with other substances which it is desired to test, and that whatever changes may be necessary in each instance may be made within the scope of the claims. For the purposes of the present illustration the gages are constructed to take from the supplied liquid samples of equal volume.

We claim as our invention:—

1. In a testing machine, the combination with mechanism for automatically taking a plurality of samples each of predetermined volume from a quantity of supplied material, and mechanism for automatically and concurrently applying tests differing in kind to said samples.

2. In a testing machine, the combination with a receiving basin, of a funnel located beneath the same and provided with a plurality of branches, a measure located in position to receive liquid from each of said branches, testing units, and mechanism for conveying the measures to the testing units respectively.

3. In a testing machine, the combination with a pair of test tubes, of a funnel located in position to direct its contents into each of said tubes, a plurality of reagent bottles having outlets communicating with said funnels, a receiving basin, a funnel provided with two branches located below said basin, a pair of sample measures located respectively in position to receive from the said branches, mechanism for conveying the measures to and discharging the contents of the same into the respective funnels, said test tubes being provided with outlet stoppers, mechanism for supplying rinsing water to the measures, the test tubes and the basin, mechanism for supplying measured quantities of reagent to the respective funnels, and mechanism for actuating the various parts of the apparatus in time sequence.

4. In a testing machine, the combination with a plurality of test tubes, mechanism for automatically supplying reagents to the test tubes, and mechanism for automatically heating one of the test tubes in timed relation to the introduction of the reagents thereinto.

5. A device for automatically testing liquids and rendering visible the reactions accompanying the test, which comprises a plurality of visibly disposed transparent test tubes, means for presenting to the tubes measured samples of the material to be tested, means for presenting to the samples in the tubes measured quantities of reagents at proper intervals, heating one of the test tubes at the proper time, and mechanism effective after the expiration of the time necessary for the course of the reaction to empty the test tubes and to rinse the portions of the apparatus coming in contact with the tested material, and mechanism to return the operative portions into initial working positions.

6. The method of testing materials which consists in automatically taking a plurality of samples each of predetermined volume from a quantity of supplied material, and then automatically and concurrently applying tests differing in kind to said samples.

7. In a testing machine, the combination with mechanism for automatically applying tests to a sample of material, mechanism for taking a sample of measured volume from a quantity of material supplied and delivering the same to said testing mechanism, and a motor adapted to be set in motion by the operator for actuating said mechanisms and to automatically stop upon the completion of the test.

8. In a testing machine, the combination with mechanism for automatically applying tests to a sample of material, mechanism for taking a sample of measured volume from a quantity of material supplied and delivering the same to the said testing mechanism, and a gravity motor comprising a tank, mechanism for emptying the tank at the limit of its excursion for releasing the weight and flushing portions of the machine, and mechanism for filling the tank at the limit of its recession, said tank being adapted to be released by the operator for actuating the testing mechanism.

9. In a liquid testing machine, the combination with a receiving basin provided with a spout, of a sampler located in position to receive liquid from said spout, means for holding said sampler in a predetermined tilted position during the reception of liquid for enabling the same to receive a measured body of liquid less than its capacity, means for elevating the sampler, means for causing the sampler to assume a normal upright position upon the inauguration of its upward movement to afford a margin of safety against spilling such measured body of liquid, testing mechanism, and means for tipping the sampler for delivering said measured body of liquid to the testing mechanism.

10. In a testing machine, the combination with mechanism for measuring a sample from an excess of material supplied, a sink for receiving the excess, testing mechanism, means for releasing the products of the test into the sink, a water gravity motor for operating the several parts of the machine in timed sequence, and means actuated by the motor upon the completion of the operation of the machine for releasing the water therefrom into the sink for flushing the same.

11. In a testing machine, the combination with mechanism for measuring a sample from an excess of material supplied, a sink for receiving the excess, testing mechanism, means for releasing the products of the test into the sink, means for washing the sampler, testing mechanism and associated parts, the sink being in position to receive the washings, a water gravity motor for operating the several parts of the machine in timed sequence, and means for directing the water employed for the motor into the sink for flushing the same upon the completion of the operation of the machine.

12. The combination with testing apparatus of a sampler, a weighted body carrying said sampler, mechanism associated with said sampler for holding the same in a tilted position when said weighted body is at the end of its downward excursion, a spout for directing liquid into said sampler when in such tilted position, and means associated with the testing apparatus for tilting the sampler into position to discharge its contents into the testing mechanism at a predetermined point in its upward excursion.

13. The combination with testing apparatus of a sampler, a weighted body carrying said sampler, mechanism associated with said sampler for holding the same in a tilted position when said weighted body is at the end of its downward excursion, a spout for directing liquid into said sampler when in such tilted position, means associated with the testing apparatus for tilting the sampler into position to discharge its contents into the testing mechanism at a predetermined point in its upward excursion, and means for directing washing liquid into the sampler while in such tilted position.

14. The combination with testing apparatus of a sampler, a weighted body carrying said sampler, mechanism associated with said sampler for holding the same in a tilted position when said weighted body is at the end of its downward excursion, a spout for directing liquid into said sampler when in such tilted position, means associated with the testing apparatus for tilting the sampler into position to discharge its contents into the testing mechanism at a predetermined point in its upward excursion, means for directing washing liquid into the sampler while in such tilted position, and means for sequentially discharging the product of the test and releasing the washing liquid.

15. The combination with a urinal-basin, of means associated therewith for taking a sample of measured volume from the urination of the operator into such basin, and testing mechanism for performing a test upon such sample.

16. The combination with a urinal-basin, of means associated therewith for taking a sample of measured volume from the urination of the operator into such basin, and testing mechanism located in position to be exposed to the view of the operator for performing a test upon such sample.

17. The combination with a urinal-basin, of means associated therewith for taking a sample of measured volume from the urination of the operator into such basin, a test tube located in position to be exposed to the view of the operator, means for depositing such sample in the test tube, and means for performing tests upon such sample.

In witness whereof, we have hereunto signed our names in the presence of two subscribing witnesses.

BÉLA SÁGI.
EUGEN SÁGI.

Witnesses:
  CHAS. LYON RUSSELL,
  FRED WHITE.